W. R. FOX.
FLEXIBLE SHAFT COUPLING.
APPLICATION FILED FEB. 20, 1917. RENEWED APR. 2, 1919.
1,304,759.
Patented May 27, 1919.
2 SHEETS—SHEET 1.
Fig.1.
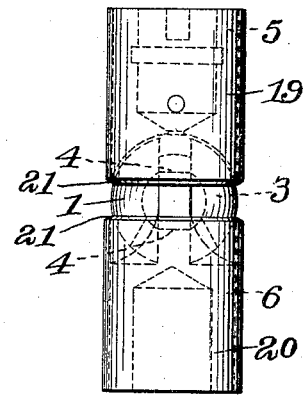
Fig.2.
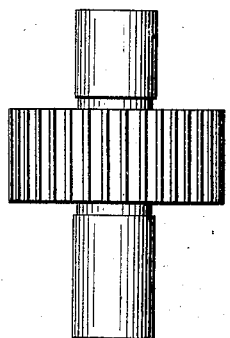
Fig.3.  Fig.4.
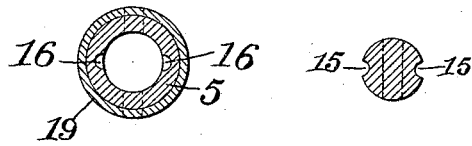
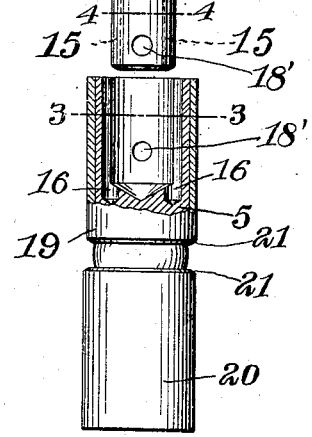
Fig.5.
Inventor:
William R. Fox,
by Spear, Middleton, Donaldson & Spear
Atty's.

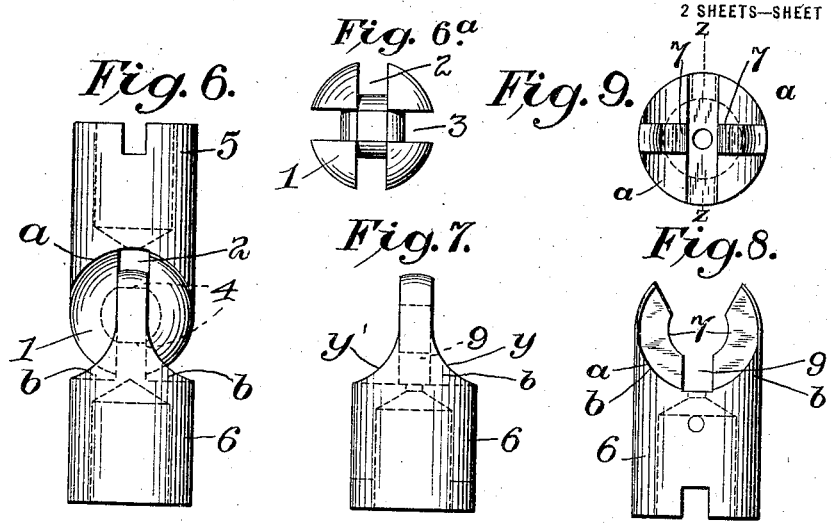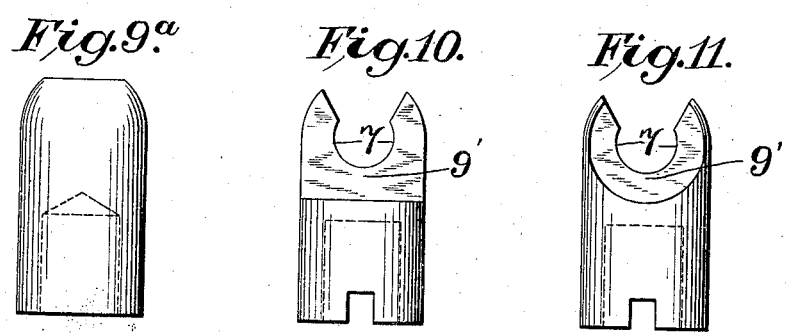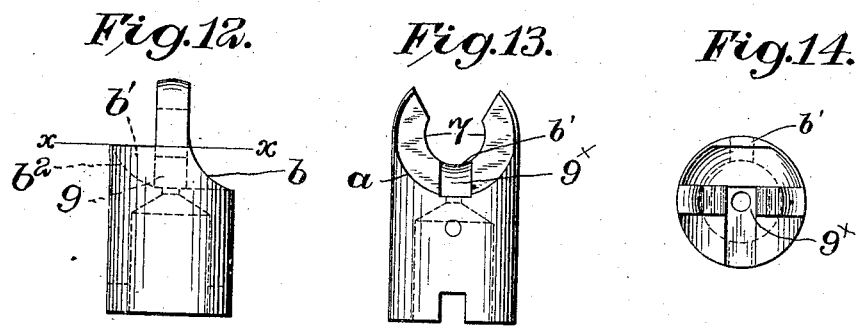

UNITED STATES PATENT OFFICE.

WILLIAM R. FOX, OF JACKSON, MICHIGAN.

FLEXIBLE SHAFT-COUPLING.

1,304,759.     Specification of Letters Patent.     Patented May 27, 1919.

Application filed February 20, 1917, Serial No. 149,795. Renewed April 2, 1919. Serial No. 287,070.

*To all whom it may concern:*

Be it known that I, WILLIAM R. FOX, a citizen of the United States, and resident of Jackson, Michigan, have invented certain new and useful Improvements in Flexible Shaft-Couplings, of which the following is a specification.

My invention is an improvement in flexible shaft couplings in which coupling heads provided with forks embracing and connected by a ball are employed, the forks entering circumferential grooves extending about the ball at right angles to each other and having movement therein.

A coupling of this general character is disclosed in application for Letters Patent of the United States filed by me January 15th, 1916, #72310, my present object being to provide a construction which will reduce the cost of manufacture and also will provide a stronger construction than that illustrated in my previous application.

The invention consists in the features and combination and arrangement of parts hereinafter described and particularly pointed out in the claim.

In the accompanying drawings;

Figure 1 is a view of the coupling complete.

Fig. 2 is a view of a coupling partly in section showing also the pinion spindle separate from the coupling to which in practice it is attached.

Fig. 3 is a cross sectional view of one of the coupling heads, on line 3—3 of Fig. 2.

Fig. 4 is a cross sectional view through the spindle on line 4—4 of Fig. 2.

Fig. 5 illustrates a fastening pin.

Fig. 6 is a view of the two coupling members with their external sleeves omitted.

Fig. 6ᵃ is a view of the ball.

Fig. 7 is a side view of one of the coupling members.

Fig. 8 is a view of the member of Fig. 7 a quarter turn therefrom.

Fig. 9 is a plan view of the coupling member of Figs. 7 and 8.

Fig. 9ᵃ is a view of the blank from which the member of Figs. 7, 8 and 9 is formed.

Fig. 10 is a view of a coupling member which may be employed as a companion to that shown in Figs. 7, 8 and 9.

Fig. 11 is a view of another form of coupling member which may be used as a companion to that shown in Figs. 7, 8 and 9.

Figs. 12, 13 and 14 are views like 7, 8 and 9 of another form of coupling member.

In carrying out my invention I employ a ball form of connector 1 having grooves 2, 3 in planes at right angles to each other and intersecting each other with flattened portions 4 at the bottoms of the grooves where they intersect, these flattened portions being no greater in area than that bounded by the planes of the walls of the intersecting grooves, the bottoms of the grooves between the points of intersection being rounded or curved on arcs concentric with the periphery of the ball, this construction leaving a portion at the center of the ball of maximum size for strength. This ball forms a connector between the heads or members 5, 6, each of which heads has a fork projecting therefrom of narrow thickness to fit in the groove of the ball and of a width substantially equal to the diameter of the ball. The interior opening of each fork is of a diameter or size adapted to permit the fork to be engaged with the ball by slipping it over the flat portions thereof at the bottom of the groove and then by relatively turning the ball and coupling member the fork thereof will engage the rounded surface of the center portion at the bottom of the groove and as the opening in the fork has rounded surfaces 7 corresponding to the curved surface of the bottom of the groove in the ball the ball and fork will be locked together but free relative turning movement will be permitted between these parts.

In order to permit the forks to be assembled with the ball one of them is provided with a gate or opening 9 of a width substantially equal to the thickness of the other fork so that one arm of this fork will be free to pass through this gate when the heads are disposed at right angles to each other and this fork will thus slip over the flattened part of the reduced portion of the ball and then by turning the forks to coincide axially they will be held connected by the ball. This gate-way, however, being formed by cutting away the metal at the base of the fork tends to weaken the fork at this point and under strain the arms, as a consequence of the use of the gate or opening, are liable to spread, and one object of the present invention is to strengthen the fork so that notwithstanding the presence of this gate-way it will resist all tendency of its arms to spread. This gate-way need be formed in only one of the forks, the other being left uncut at the point 9' and being of full strength here.

In order to provide this strengthened construction I employ, instead of a straddle milling cutter such as would be used for making the fork of Fig. 10, an end milling cutter which will produce the fork shown in Figs. 6, 7, 8 and 9, this cutter making a circular cut, as at $a$ leaving integral parts of the metal at $b$, reaching up along the edges of the fork, instead of leaving the base of the fork on one straight line and of one thickness throughout as in Fig. 10. It will be noted that the fork by this improved construction is reinforced just at the points where added strength is needed, i. e., at the base of the fork arms on each side of the bottom of the gate or through way 9 and tendency of the arms of the fork to spread is thus resisted.

The fork construction is symmetrical as to both of its sides, as shown in Fig. 7, the fillet of metal or reinforcement being equal in size and form at each side of the fork. The curve $a$ corresponds to the curve of the ball.

As shown in Fig. 6 each coupling head may have its fork formed with the end mill or counter bore cutter just mentioned as this is a less expensive method of making the fork arm than by using the cutter necessary to produce the form of fork shown in Fig. 10, though it will be clear that one coupling head having the gate 9 and the reinforcements $b$ may be used in conjunction with a head, such as shown in Fig. 10, in which the fork portion has plain sides throughout and there is no gateway as at 9, such form of head being sufficiently strong without the reinforcements or fillets.

If it is desired to employ a coupling head of still stronger form than that shown in Figs. 6 to 9, the coupling head can be cut away only enough to admit of the reception of the other fork in proper relation for assembly or detachment, as shown in Figs. 12, 13 and 14. In this case only one side of the head is milled away corresponding to the recess at $a$, Fig. 8, this cut away part exposing the opening at $9^x$, whereas on the other side of the fork the metal is left at $b'$ extending all the way around from one edge of the fork to the other edge. This additional metal extends up to a plane $x$—$x$ a little below the center of the height of the fork and interiorly it is of cup-shape to fit the surface of the ball as indicated by the line $b^2$. In assembling the parts the ball is first put in place in the head of Fig. 12 and then the other head is positioned at right angles to the first head and at the right thereof and with its fork arm in line with the opening $9^x$ and it is then thrust into place, the proper groove of the ball of course having been registered with the notch or gate $9^x$.

It will be understood that in using the fork shown in Figs. 7, 8 and 9 the companion fork may be of similar construction or may be of the form shown in Figs. 10 and 11, or if desired a companion member like that shown in Figs. 12, 13 and 14 may be employed, it being understood, however, that the gate way 9 need be made only in one coupling member. The form shown in Figs. 12, 13 and 14 may have a mate like that of Figs. 10 and 11.

In making the coupling head shown in Figs. 7 to 9 a blank such as is shown in Fig. $9^a$ is placed in a jig and a round opening is drilled through the blank laterally which hole provides the inner curved edges to engage the ball. After being thus drilled a counter bore or end mill is brought to bear upon the work and one side is cut away to the proper size, resulting in the side configuration as at $y$, Fig. 7 and $a$, Fig. 8. Then the jig is reversed and the same tool is brought to bear upon the other face of the blank reducing this as at $y'$, so the two sides appear as shown in Fig. 7. The blank is then taken out and placed in another fixture and the mouth of the fork is then cut out through to the opening which was drilled at the first operation, after which the rectangular opening or gate 9 is formed in one of the heads. This completes the operation and results in a low manufacturing cost.

I have also improved the means for attaching the coupling head to the spindle carrying the driving pinion. I form in the outer face of the spindle, and extending longitudinally thereof two grooves 15, see Fig. 4, and in the interior of the head I form two grooves 16 extending longitudinally thereof and these grooves coincide with those on the spindle when the spindle is inserted in the coupling head. Cylindrical keys or pins are inserted in these grooves and hence lock the coupling head to the spindle so as to be forced to rotate therewith. To hold the coupling head from dropping off from the spindle a pin 18 extends transversely through the head and spindle at 18'. This pin may be an ordinary cotter pin or it may be like that shown in Fig. 5, having a groove at one end into which a wire may be sprung to hold the pin in place.

The coupling heads are provided with sleeves 19, 20 fixed thereto whose opposing edges at 21 serve by coming in contact with each other, to limit the angular relation of the heads.

It will be observed that with the construction described the head at either one or both sides of the fork will have a shoulder which instead of being in one straight plane as in Fig. 10 will be curved corresponding substantially to the curve of the circumference of the ball. This shoulder because of the cylindrical form of the head is widest at the center plane z—z of the head Fig. 9 and decreases in width as it rises laterally from this center plane to the terminal point above the plane of the bottom of the notch 9.

What I claim is:—

In combination in a universal joint, a ball having grooves extending in planes at right angles to each other leaving a core, said core at the points where the grooves intersect being flattened, and a pair of heads having forks to pass over the flattened portions of the core and having interior curved faces to conform to the curved sides of the core, one of the heads having a gateway at the base of its fork communicating with the opening within the fork, said head also having integral reinforcing portions at the sides of the fork reaching up to a plane above the bottom of said gateway and on opposite sides thereof to stiffen the arms of the fork against spreading substantially as described.

In testimony whereof I affix my signature.

WILLIAM R. FOX.

Witnesses:
NORA M. GORTON,
IRENE M. GERMAN.

Copies of this patent may be obtained for five cents each, by addressing the "Commissioner of Patents, Washington, D. C."